A. J. CROSS.
BIFOCAL LENS.
APPLICATION FILED MAY 16, 1912.
1,063,421.
Patented June 3, 1913.
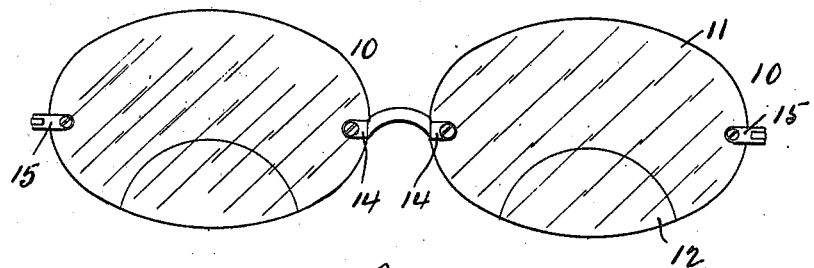
Fig. 1
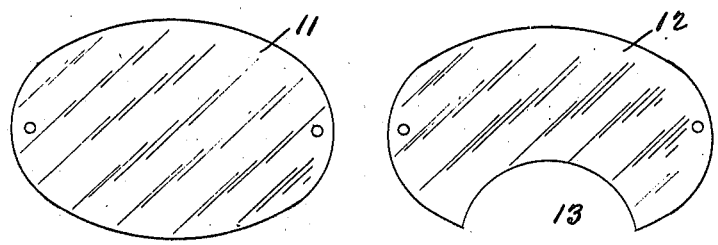
Fig. 2.    Fig. 3.
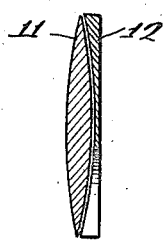   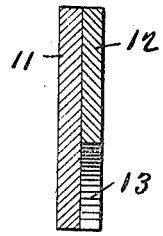
Fig. 5.    Fig. 4.
Witnesses:
Arthur K. Darnnell
M. J. O'Donnell
Andrew Jay Cross, Inventor.
By his Attorney.
W. P. Hutchinson.

UNITED STATES PATENT OFFICE.

ANDREW JAY CROSS, OF NEW YORK, N. Y.

BIFOCAL LENS.

1,063,421.

Specification of Letters Patent.

Patented June 3, 1913.

Application filed May 16, 1912. Serial No. 697,618.

*To all whom it may concern:*

Be it known that I, ANDREW JAY CROSS, of the city, county, and State of New York, have invented a new and useful Improvement in Bifocal Lenses, of which the following is a full, clear, and exact description.

My invention relates to improvements in bi-focal lenses such as are used for spectacles and eyeglasses.

It is well known that a bi-focal lens at its best, has its limitations, because it is a compromise in an attempt to combine reading glasses and distance glasses in one, to obviate the necessity of using two sets of glasses. As generally constructed they are open to certain objections, chiefly because it is difficult to secure coincident principal axes for the lens, some forms of them are expensive, difficult to change or repair, and moreover the reading surface of the glass is usually cemented on, and in many cases the cement becomes cloudy and impairs vision. Some kinds of these lenses are not easily made or repaired by an ordinary lens grinder or repairer, and often, and in fact usually, the reading segment or glass is cemented on over the distance glass, and while the lens may be scientifically correct, the mode of attachment causes a ledge or shelf on the upper edge of the reading segment, which collects dust and dirt, and which even when care is taken to keep it clean, will result in an objectionable streak which confuses vision.

In an attempt to overcome some of the above difficulties, bi-focal glasses are sometimes made in which the distance glass is recessed, and a segment of reading glass of greater density set into the recess, fused in place, and then ground smooth so as to leave a surface flush with the distance glass. This makes a handsome lens, but is open to the difficulty that it often has double principal axes or centers and therefore not so scientifically correct as the older types of single axis centered bi-focal lenses, also because the curvature of the recessed segment is apt to be such as to produce more or less aberration of light and of course unsatisfactory vision.

The object of my invention is to overcome all these difficulties, and produce a simpler, more correct, not too conspicuous a glass, in which there is no danger of obscuring the reading surface by cement, and in which the reading surface can be made of any desired size, and the lens easily made or repaired. Further, to produce a lens in which the objectionable ledge or shelf above referred to is dispensed with, and an overhang produced instead, in which there is no danger of dust collecting. Furthermore, by means of my improvements, the stud straps of the glasses serve to bind the two lens members together and make them exceptionally secure, and when constructed as described below, a mono-centric, single principal axis bi-focal lens is much easier to produce, and it will be understood that unless an optically monocentric or single principal axis lens is produced, great confusion and discomfort to the wearer or user can result. This will appear clearly from the description which follows.

Reference is to be had to the accompanying drawings forming a part of this specification, in which similar reference characters indicate a corresponding part in all the views.

Figure 1 is a front elevation of a pair of spectacles provided with my improved lenses. Fig. 2 is a detail front elevation of the reading glass. Fig. 3 is a front elevation of the distance glass. Fig. 4 is a vertical cross section of the complete lens, and Fig. 5 is a vertical cross section showing the segment glass thinned at its principal axis.

In carrying out my invention I make the glass 11 which is the reading lens, the full size of the glass or lens to be produced, and of the right properties for near vision, that is for reading, while the lens segment or glass 12 shown in Fig. 3, is to be thin at its center or principal axis and of the right quality to form a distance glass when combined with or laid over the lens or glass 11. Those skilled in the profession will understand that it is a simple matter to combine the segment glass 12 with the reading glass 11, so that the combined glasses will produce a lens having the right optical effect for distance vision. There is nothing new in this phase of the lens. To illustrate the above, Fig. 4 shows the lens glasses 11 and segment glass 12, as essentially flat, while Fig. 5 shows the segment glass thinned at the center, and the glass 11 as a double convex glass, but as stated above, the peculiar configuration of the members 11 and 12 will of course vary as desired. It is new, however, to make the reading glass the full size of the lens, and to cut out a portion of the distance segment glass 12 as shown at 13, so as to leave an unobstructed section through this part of the reading glass. The result is that no shelf is produced on the reading lens which corresponds to that part of the glass 11 exposed by the recessed portion 13 of the glass 12, and consequently there is no projecting shelf of the reading glass, but simply an overhang which will not collect dust or dirt. Moreover, by making the two members of the lens the full size, it will be seen that they may or may not be cemented by the usual clear cement, but that the part of the lens for reading, which as stated is that part of the glass exposed through the recess 13, is always left entirely uncemented, and therefore clear and free from any possible discoloration or other interference. It will be further seen that by the construction described, the two members of the lens are held together by the stud straps 14 and 15, which can be of any usual kind, and which greatly strengthen the security of the lens where frames are not used. As shown the stud straps 14 form a part of the nosepiece, and the stud straps 15 connect with the bows, but on eyeglasses the parts 15 would be dispensed with. In grinding the lens an optical center or principal axis is produced on the distance glass 12, at the highest point of the recess 13, and on the reading glass 11 at the junction of the two lens members, thus producing a single optical center on 11 and 12 at this point.

From the foregoing description it will be seen that the lens is very much more inconspicuous than a lens which is produced by cementing on a reading segment of a size corresponding to the opening of part 13 over the distance glass, also it can be seen that the reading part or opening in the segment 12 can be made of any desired size, and that the members of the lens can be very easily ground, adjusted, repaired and assembled. It will also be noticed that it is easier when making the lens in this manner to bring the principal axes of the members in coincidence with each other, which is a very important matter in lens manufacture. It will be further observed that the member 11 can be placed on either the outside or inside of the member 12, as desired, without altering the effect, also that the members can be of any curvature or depth.

It will be noticed that my lens consists of two members only, that they are ground in such a manner that the lens can be kept thin and light, and moreover that it is a very simple matter to manufacture the lens, so that an ordinary person skilled in the art can make it very easily, whereas in many of the lenses comprising a multiplicity of parts with special grindings for the various members or segments, it is an exceedingly difficult matter to make the lens. It will be further observed that where more than two parts are used in a complete lens, it renders it more difficult to combine these parts or members in such a manner as to get absolute accuracy of vision, and that where there are few parts this is much easier. Further, that by having the two parts arranged as shown, I have the close vision segment or member always exposed, and if this is ground right, it is correct without having to experiment on any other member which may be combined with it. Furthermore, I can easily control the center of the two members, and easily get coördinating principal axes.

I claim:—

1. A bifocal lens comprising two members of essentially the same superficial size, the close vision member being complete, and the opposite member having a section removed to expose a clear section or segment of the close vision member.

2. As an improved article of manufacture, a bifocal lens comprising two combined members, one member being complete and the opposite member being of substantially the same superficial size as the complete member but having a section removed to expose a corresponding portion of the complete member, and leaving the incomplete member overhanging the complete member.

3. A bifocal lens for glasses and spectacles, comprising two combined members of essentially the same circumference and principal axes, each adapted to be straddled by a stud strap, one member constituting the close vision glass being complete, and the second or overlapping member having a portion removed to expose a clear section of the first or close vision member.

4. A bifocal lens comprising two members, one member being complete, the second or overlapping member being incomplete so as to expose a clear segment of the first or close vision member, and the two members being combined to produce the desired distance vision.

ANDREW JAY CROSS.

Witnesses:
JOHN HERRMANN,
JAMES R. R. McEWEN.